No. 748,633. Patented January 5, 1904.

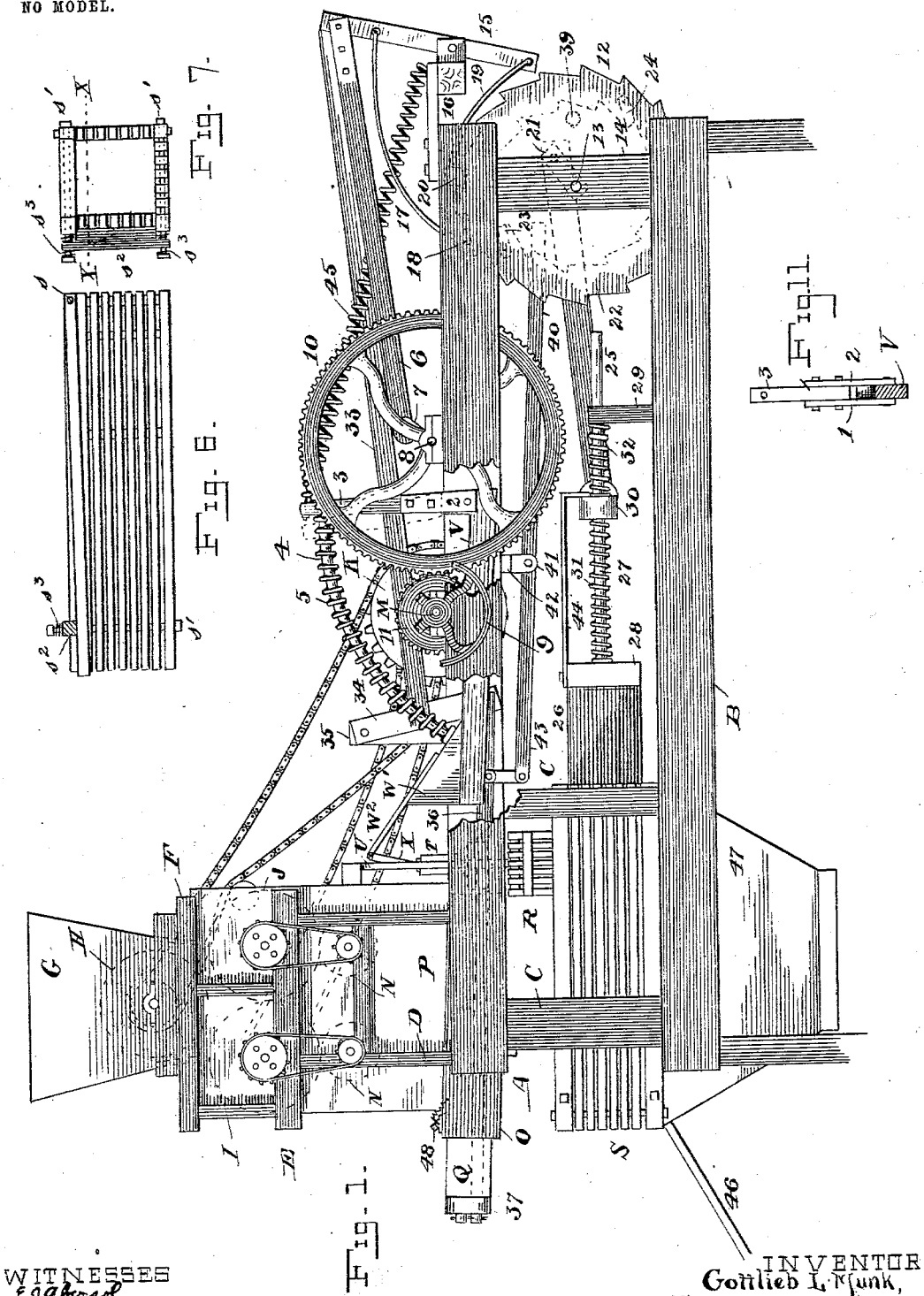

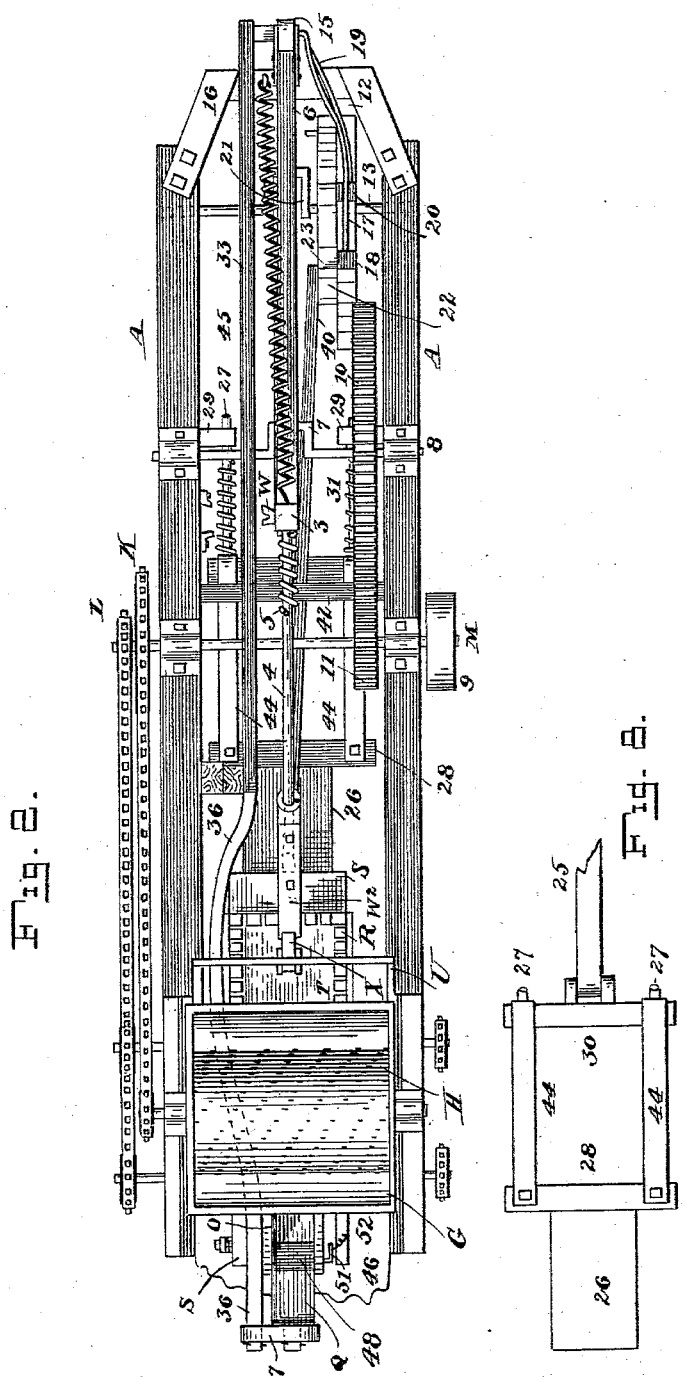

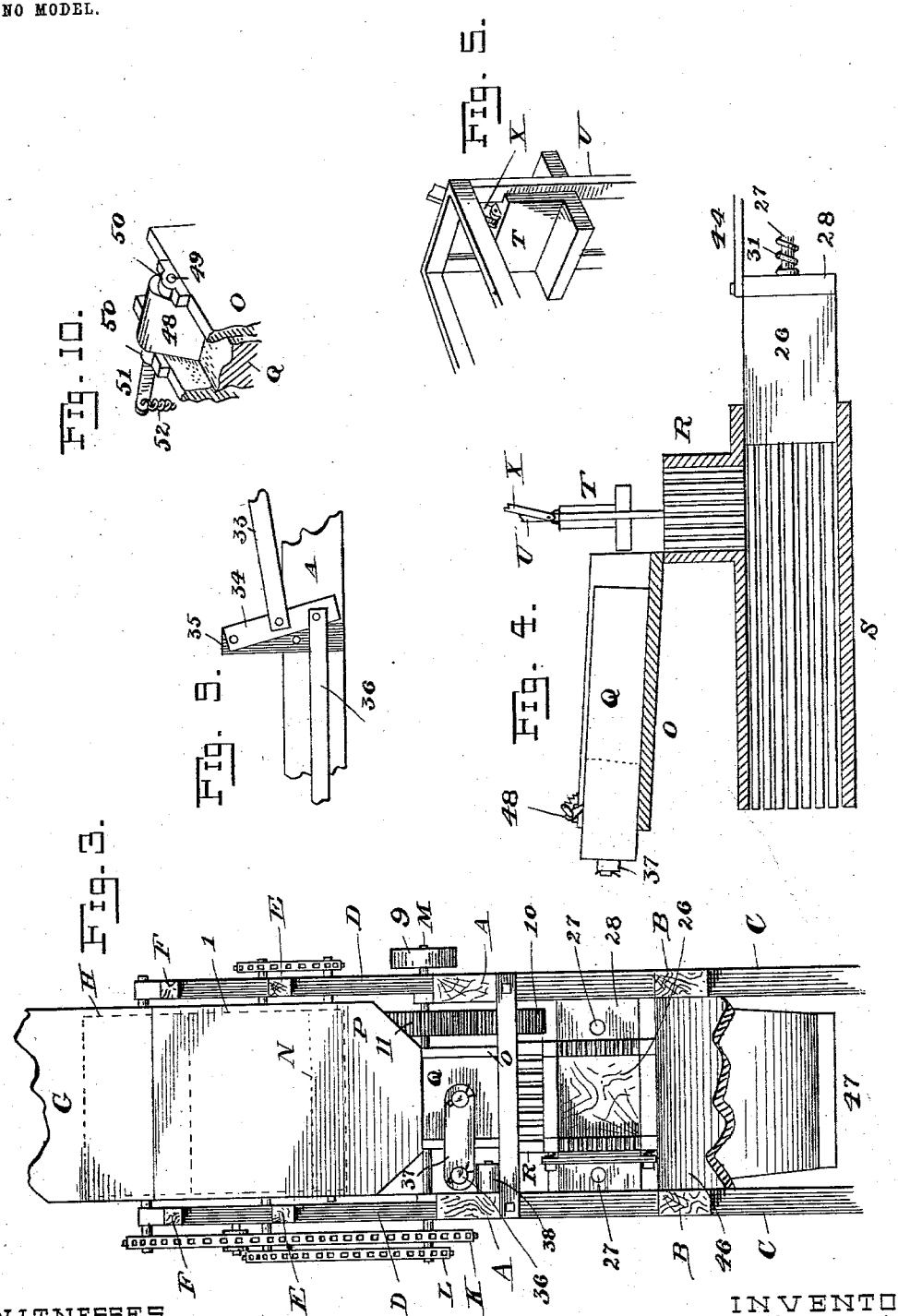

UNITED STATES PATENT OFFICE.

GOTTLIEB L. MUNK, OF PEORIA HEIGHTS, ILLINOIS.

CIDER-PRESS.

SPECIFICATION forming part of Letters Patent No. 748,633, dated January 5, 1904.

Application filed May 4, 1903. Serial No. 155,524. (No model.)

*To all whom it may concern:*

Be it known that I, GOTTLIEB L. MUNK, a citizen of the United States, residing at Peoria Heights, in the county of Peoria and State of Illinois, have invented certain new and useful Improvements in Cider-Presses; and I do hereby declare that the following is a full, clear, and exact description of the invention, which will enable others skilled in the art to which it appertains to make and use the same.

This invention pertains to an improved cider-press.

The object of the invention is to provide a press of simple form having great power and one that is continuous in its work.

A further object is to provide a series of receivers in which the fruit is put under partial pressure to extract the juices before being put under final pressure.

The invention also has as an object to arrange a new construction in a cider-press, and the various advantages will appear in the following specification.

In the appended drawings, Figure 1 is a side elevation of the machine. Fig. 2 is a plan view thereof. Fig. 3 is an end view. Fig. 4 is a longitudinal section of a series of receivers for the fruit products. Fig. 5 is a perspective view of a vertical plunger used for forcing the products into a horizontal pressure-chamber. Fig. 6 is a plan view of the horizontal pressure-chamber last referred to. Fig. 7 is an end view thereof. Fig. 8 is a plan view of a plunger. Fig. 9 is a view of a rocking arm and its attachments. Fig. 10 is a perspective view of a scraper for the plunger of one of the receivers. Fig. 11 is an edge view of an arm used for assisting in depressing a plunger of a receiving-chute.

In the figures, A and B are two pairs of horizontal supporting-sills, which are held one above another, as shown, by uprights C, thus forming a frame. Upon the top sills A A at one end is a smaller supporting-frame D E F, upon which is mounted a hopper G, within which revolves a breaking-roller H, the shaft thereof being journaled on the said frame D E F. Beneath said roller H are two rollers I J, which revolve toward each other. These rollers, as well as the roller H, are driven from sprockets K and L on a driving-shaft M, having bearings on the top of the sills A A. The sprocket-chain which drives the rollers I J passes under the sprocket of the roller J and over that of the roller I, thus imparting to each a reverse direction of movement. Below each roller last mentioned is a revolving brush N, each of which receives motion from its complementary roller by sprocket-chains. A receiver or trough O is placed below the rollers to receive the crushed fruit and juice, the same being guided thereinto by means of a hopper P, which incloses the rollers and brushes up to the hopper G, as shown in Figs. 1 and 3. Within said receiver is a plunger Q, which receives a reciprocating motion, by mechanism to be described, to push the fruit continually into a chute R. The latter is composed of vertical slats forming a square inclosure and rests upon a pressure-chamber S, which is provided for giving the final pressure to the fruit. This latter member is in rectangular form of square cross-section and is composed of slats, as shown. The chute R has a vertical plunger and the chamber a horizontal one, as shown. The former is shown in Fig. 5 and consists of a block T, which fits the square chute and is kept in line by a guiding-frame U, which at its top is attached to the hopper P in any good manner. Its lower extremities are fastened to the top of the chute in such manner as to perfectly guide the plunger into the chute. The means of carrying the plunger consists of an arm V, Fig. 1, pivoted at one end to a bracket W, Fig. 2, secured to one of the sills A, but which is shown broken away to indicate the parts beneath it. At its other end the arm carries a block W', to which is secured an arm W² at an angle to the said arm V. The free end of the arm W² is loosely connected to the plunger by a link X. At the pivotal end of the arm V and held by the same pivot as said arm are two arms 1 and 2, Fig. 11, whose upper ends rigidly hold a finger 3. A rod 4, formed in the segment of a circle, is securely fastened in the block W', and passes through the finger at its other end, and a spiral spring 5 surrounds the same and bears against the said block at one end and at the other against the said finger 3. Motion is imparted to the arm V and its plunger through a pitman 6, carried by a crank 7 on a shaft 8, journaled on the top sills A, parallel with the shaft M, which carries the sprockets K L. Said shaft 8 receives motion through a gear 10 from a pinion 11 on said shaft M, and a belt-pulley 9 receives motion from the source of power. The pitman 6 is in line with the finger 3 and at each revolution of the crank strikes said finger and pushes it forward and in consequence by the pressure of the spring 5 solely depresses the arm V, and consequently the plunger T, which descends into the chute R, carrying any fruit therein down into the chamber S. The office of the pitman referred to is not only to operate the plunger, but, as will be seen, serves to assist in imparting motion to a ratchet-wheel 12 on a shaft 13, mounted between the uprights 14 of the rear of the frame. A rocking arm 15, pivoted to a projecting support 16, is pivotally connected at its upper end to the pitman 6, from which it derives its rocking motion. Just below said pitman is an arm 17, pivoted to the arm 15 at one end, its free end carrying a block 18 for engaging the teeth of the ratchet-wheel 12, said arm and its block acting as a pawl. The lower end of the arm 15 also carries an arm 19, on the free end of which is a block 20. Now by each revolution of the crank 7 the arm 15 will rock back and forth, as is evident. This motion will revolve the ratchet-wheel toward the right as viewed in Fig. 1. This results in turning the shaft 13 and its crank 21 slowly around. A similar ratchet-wheel 22 is mounted beside the first, and pawls 23 and 24 on the wheel 12 serve to impart motion to it and being affixed to the shaft the wheel 22 turns with the shaft and crank. Connected to the crank is a pitman 25, whose other end serves to operate the plunger 26 of the chamber S. Said plunger is supported by means of two rods 27, which are rigidly secured in the ends of the bar 28, attached to the outer end of the plunger, as shown in Fig. 8. The free ends of the said bars or rods 27 are supported in guides 29 on the sills B. Upon the rods is a cross-head 30, to which the pitman is pivoted, as shown in said Fig. 8. Springs 31 and 32 are placed on the rods between the bar 28, the cross-head 30, and the guides 29, as shown in Fig. 1, the purpose of which will appear in the description of the operation of the machine. The rocking arm 15 transmits motion to the plunger Q in the following manner, due to the connection now to be described: To the upper end of said arm 15 is pivoted the end of a rod 33, whose other end is pivoted to an arm 34, which is pivoted at its upper end to an upright 35, attached to the sill A. The lower swinging end of said arm pivotally carries the end of a rod 36, whose other end is connected to the outer end of the plunger Q by means of a loose link 37, as clearly shown in Figs. 2 and 3. A roller 38, Fig. 3, supports the arm 36 and prevents possible sagging thereof. The operation of the press is as follows: Power being applied to the shaft M through the belt-pulley described, motion is imparted to the roller H in the hopper G as well as the rollers I J. Said roller H being provided with teeth cuts the apples fed into the hopper into pieces, which are carried down between the rollers I and J. These rollers crush the pieces, after which they fall into the receiver O. The particles which adhere to the rollers are swept off by the revolving brushes N, which keep the said rollers perfectly clean. The gear 10 is also receiving motion from the gear M and as it revolves imparts a vibratory motion to the arm 15 through the crank 7 and pitman 6, as already described. The motion thus set up transmits a like vibratory motion to the hanging arm 34 and by the rod 36, connected therewith, operates the plunger Q in the receiver O, thereby crowding the fruit falling thereinto down to the chute R by continued strokes as the crank revolves, and at each portion of the revolution as the crank carries the pitman 6 against the arm 3 the latter is pushed before it and by pressing upon the springs 5 depresses the arm V, causing the plunger T to descend into the chute to carry the fruit down to the chamber S. It will be noted that the said plunger T will be depressed after the plunger Q has been drawn away from the chute. In other words, after the fruit has been pushed under the plunger T said plunger will push the accumulated material down ready for the next filling. The amount of travel of the plungers Q and T is much more than that of the plunger 26, for the reason that the former travel a full stroke at each revolution of the wheel 10, while the latter moves one stroke to every turn of the ratchet-wheel 12 caused by the movement of the pawls of the rocking arm 15. The cross-head 30 being loose on the rods 27 is pushed along them by the pitman 25 against the springs 31. The springs are quite stiff and will gradually force the plunger against the fruit being pressed in the chamber S and at the same time will give sufficiently to permit the pitman to travel even though the plunger comes to a standstill, so that if the plunger has only entered the chamber a short distance and is stopped by the compressed pomace the action of the ratchet-wheel 12 will not be altered, since the spring will give and permit its full revolution, while at the same time the pressure obtained is sufficient for the required extraction of the juices. When the crank has been moved around to a point just above a line drawn from the point of connection of the pitman with the bar 30 and the shaft 13 and said crank is between these two places, the springs, which up to this time have been under compression, will expand and throw the said crank over to the position shown in Fig. 1, from which position said crank will again be moved around by the pawls of the vibrating arms 15. When thus moved, the wheel 22, which is attached to the shaft and crank, revolves without reference to the wheel 12, since the pawls do not hold it when revolving away from them. Therefore the said wheel 12 will still continue to revolve by reason of the continuous movement of the pawls of the arm 15. A pin 39 is affixed to the wheel 22, and at the time the crank 21 is nearing its position of release just described said pin is contacting with the free end of a lever 40, pivoted to a hanger 41, supported on a crossbar 42 of the sills A, Figs. 1 and 2, and whose other end is pivotally connected by a link 43 to the forward end of the arm V. This arrangement is provided for the reason that a greater leverage can be had for depressing the plunger T than by the finger 3 and spring 5. As before stated, the plungers Q and T do not operate simultaneously, but first one and then the other, and both perform seven or eight strokes to one of the plunger 26, so that the fruit is packed continually into the chamber S for compression. The last stroke of the plunger T is a stroke of compression by pressure due to the pin 39 and lever 40. This pressure will be upon the fruit on top of the plunger 26, and the cider pressed out will naturally flow downward to the chamber and thence to the receptacle for the same, and any that may be absorbed by the pomace in the chamber S will be quickly expelled at the next stroke of the plunger 26. When the latter member has been withdrawn from its chamber, the next stroke of the plunger T will push the entire bulk within the chute R into the chamber, and the final compression of that particular bulk will follow. The springs 32 are to receive the impact of the plunger 26 due to the springs 31 and serve, therefore, to receive the jar. A pair of bent rods 44 are secured to the bar 28 of the plunger, as shown in Figs. 1 and 8, and are used to withdraw the plunger from the chamber by the movement of the crank and pitman if for any reason it should remain fixed and the springs are not of sufficient strength to accomplish that end. It must be understood that when the crank is thrown over to the starting position shown the pin 39 passes the lever 40 and permits the plunger T to rise by reason of the pull of the spring 45, which has been under strain during the depression of said plunger. Said spring serves to restore the arm V to its normal or raised position also after each downward movement due to the pitman 6, as will be understood. I desire now to explain the construction of the chamber S, a plan view on line X X, Fig. 7, being shown in Fig. 6. One side of this portion is fixed and the other is swung at one end on a pivot s. A pair of bolts s' are carried through the top and bottom and the ends, and a pressure-piece $s^2$ bears against the said movable side and springs $s^3$ between the said pieces, and the bolt-heads serve to keep a yielding pressure on the side, as will be understood.

In starting the press, a block must first be fixed in the ejecting end of the chamber, against which the plunger 26 may force the pomace and gradually form a hard lump, after which the said block may be removed, and the lump formed will answer the same purpose and against which the following material from above may be forced to extract its juices. After the pomace is well packed each succeeding pressure will pack it harder by the addition of more material, and the pressure of the spring-actuated side will be such as to permit the pomace to issue very slowly. A chute 46 carries the pomace away, and a hopper 47 receives the cider. Located on the top of the receiver O is a scraper 48, as shown in Fig. 10. This is carried by a shaft 49 in bearings 50, and an arm 51 on the shaft by the tension of a spring 52 holds said scraper upon the plunger Q, thereby removing the accumulations therefrom at each movement and dropping it into the receiver, all of which will be understood. It has been found that more cider can be produced from a given amount of fruit by this form of press than with any other, for the reason that by the time the pomace reaches the chamber S the greater part of the cider has been removed from it, and the final and continued pressure in the chamber through the entire length thereof expels all moisture not previously extracted. Obviously with a press of any ordinary type the pomace would not be held a sufficient length of time to produce this result. The device is intended to be driven continuously and the fruit fed without cessation.

In presenting my invention and application I desire to state that it is not the intention to limit myself to the exact construction shown and described, as changes may be made which will come within the meaning and spirit of the invention.

I claim—

1. In a cider-press, means for reducing the fruit before pressure, a pressure-chamber for receiving the reduced fruit, a plunger for said pressure-chamber, means for operating the plunger consisting of a pitman connected thereto, a crank for carrying the free end of the said pitman, a ratchet-wheel on the shaft of said crank, means for forcing the plunger slowly into the chamber by intermittent movements of the said ratchet-wheel and springs for withdrawing the plunger after each stroke and returning the driving parts to their starting position for the purposes described.

2. In a cider-press, the hopper, means for reducing the fruit, a pressure-chamber for receiving the reduced fruit, a plunger for said chamber, means for entering such plunger into said chamber by short slow intermittent movements and means for withdrawing the same at one quick movement for the purposes explained.

3. In a cider-press, means for reducing the fruit, a chute for the fruit after such reduction, a plunger for moving the said fruit from said chute, a receiver and pressure chamber for receiving the fruit from the chute and a plunger for putting pressure upon the fruit in said chamber for extracting the juices therefrom.

4. A cider-press comprising means for reducing the fruit, a receiving and pressure chamber for the reduced fruit, a plunger for the said chamber, a pitman-rod connected therewith, a crank for imparting movement to said pitman, a ratchet-wheel on the crank-shaft, a rocking arm pivoted between its ends on the machine, a pawl at each end of the arm for engaging the ratchet-wheel means for operating the arm for moving the pawls to transmit movement to the ratchet-wheel in an intermittent manner for half of its revolution for entering the plunger into the chamber and springs for withdrawing the plunger when the crank and pitman pass over the center as described.

5. In a cider-press the combination of a roller for breaking the fruit, rollers for crushing it after being broken, a receiver for catching the crushed fruit and juices, a chute for receiving the fruit from the said receiver, a compression-chamber beneath the chute, a plunger within the chute the same having a continuous reciprocating motion for forcing the fruit into the compression-chamber, means for producing that movement, a plunger within the chamber having a gradual intermittent forward movement into the chamber to slowly compress the fruit, such plunger moving beneath the first chamber and forming the bottom of that chamber at times to permit pressure of fruit thereon, means for operating the plunger as described and means for withdrawing the same after its greatest pressure is attained, the plunger within the chute adapted to pass the compressed fruit upon the plunger of the compression-chamber into the chamber after such plunger is withdrawn as described.

6. A cider-press comprising a breaking-roller, crushing-rollers beneath the same, revolving brushes in contact with the crushing-rollers, means for imparting motion to the rollers and brushes, a receiver beneath the rollers, a plunger therein for forcing the fruit therefrom, a chute for receiving the fruit, a pressure-chamber for receiving the fruit from said chute and means for providing pressure for the chamber for the purposes described.

7. A cider-press comprising a hopper, a breaking-roller within it to which the fruit is fed, crushing-rollers beneath the breaking-roller, means for driving the rollers, brushes revolving in contact with the last-named rollers and driven thereby, a casing for inclosing the rollers and brushes, a receiver beneath the rollers and having the casing opening thereinto, a plunger within the receiver for clearing the latter of the fruit falling into it, a chute for the fruit being thus cleared, a plunger for the same, a pressure-chamber below the chute and into which the chute opens, a plunger for the chamber and means for operating the several plungers all being arranged substantially as described.

8. In a cider-press, the frame A and B, the rollers H, I, J, thereon as described, the receiver O beneath the rollers the pressure-chamber S, the chute R for conveying the contents of the receiver O to said chamber, a plunger Q for the receiver O, a plunger T for the chute R, a plunger 26 for the chamber S and means for operating the plungers first one and then the other of the two first mentioned the same being made to reciprocate several times to one reciprocation of the latter plunger for the purposes set forth.

9. In a cider-press the frame A and B, the rollers H I, J revolubly mounted thereon as set forth, means for imparting movement thereto, a receiver O beneath the rollers, a plunger Q within the same for the purposes set forth, a pressure-chamber S, a chute R opening into the latter and providing a passage-way from the receiver to the chamber S, a plunger T for the chute, a plunger 26 for the chamber, a rod having connection with the plunger Q, said rod receiving movement from the driving mechanism of the machine to operate said plunger Q, the arm V pivoted at one end to the frame of the machine and carrying the said plunger T at the other and adapted to be depressed when the plunger Q is drawn away from it, a cranked shaft 13 journaled on the machine-frame, a pitman connected with the crank and the plunger 26 and arranged whereby the driving mechanism will revolve the shaft and thus impart a reciprocating movement to the said plunger 26 substantially as set forth.

10. In a cider-press, the combination of the frame A and B the rollers H, I, J, the receiver O, the pressure-chamber S, the chute R, the plungers Q, T, and 26 respectively for the three latter members, a shaft M journaled on the frame, a pinion thereon, a gear-wheel meshing therewith and driven thereby, a cranked shaft upon which the said driven wheel is mounted, a pitman connected with the crank, a rocking arm 15 at the rear of the frame with which the pitman is connected whereby said arm is given a rocking movement, said pitman arranged also to operate the plunger T, a rod 36 connected to and operating the plunger Q, a cranked shaft 13 journaled on the frame, a pitman connected therewith its other end arranged to move the plunger 26, a ratchet-wheel 12 loosely mounted on said shaft, pawls carried by the arm 15 for operating the said wheel 12, a ratchet-wheel 22 on the said shaft and affixed thereto, pawls 23 and 24 on said wheel 12 adapted to engage with and drive the wheel 22 as set forth.

11. In a cider-press the combination of the supporting-frame A, B, rollers H, I, J, hopper G, receiver O and plunger Q, chute R and plunger T, pressure-chamber S and plunger 26, the shaft M journaled on the frame, gear 11 thereon, the shaft 8, gear 10 thereon to mesh with gear 11, crank 7, pitman 6 connected therewith, rocking arm 15 operated by said pitman, ratchet-wheel 12, pawls on the arm 15 for operating said ratchet-wheel, arm 33 connected with the arm 15 for operating plunger Q, arm V pivoted on the frame A, B, arm 3 having loose connection with said arm V, the guiding-rod 4, springs 5 thereon, said arm 3 adapted to impart a yielding pressure on the arm V on which the plunger T is carried, said arm 3 being operated by the movements of the pitman 6, the spring 45 for raising the arm V after each movement of depression, cranked shaft 13 on which the ratchet-wheel 12 is loosely carried, ratchet-wheel 22 affixed to said shaft, pawls 23 and 24 on the wheel 12 for driving the wheel 22, pitman 25 connected to the crank of such shaft 13, its other end connected to operate the plunger 26, the rods 27 secured in said plunger, springs 31 and 32 thereon, the cross-head 30 sliding on said rods and to which the pitman is connected whereby by the springs a yielding pressure may be given the said plunger 26, an arm or lever 40 pivoted on the machine-frame and connected with the arm V and a pin 39 on the wheel 22 for operating said arm or lever 40 and arm V all arranged substantially as set forth.

In testimony whereof I affix my signature in presence of two witesses.

GOTTLIEB L. MUNK.

Witnesses:
E. J. ABERSOL,
L. M. THURLOW.